(12) United States Patent
Schäfer

(10) Patent No.: US 6,231,007 B1
(45) Date of Patent: May 15, 2001

(54) METHOD FOR THE PRECISE SETTING DOWN OR PICKING UP OF CARGO FROM AIRSHIPS

(75) Inventor: Ingof Schäfer, Giessen (DE)

(73) Assignee: CargoLifter AG, Wiesbaden (DE)

( * ) Notice: Subject to any disclaimer, the term of this patent is extended or adjusted under 35 U.S.C. 154(b) by 0 days.

(21) Appl. No.: 09/011,779

(22) PCT Filed: Jun. 24, 1997

(86) PCT No.: PCT/EP97/03320

§ 371 Date: Jun. 16, 1998

§ 102(e) Date: Jun. 16, 1998

(87) PCT Pub. No.: WO97/49606

PCT Pub. Date: Dec. 31, 1997

(30) Foreign Application Priority Data

Jun. 25, 1996 (DE) .............................................. 196 25 297

(51) Int. Cl.[7] ................. B64B 1/22; B64C 1/22
(52) U.S. Cl. ................. 244/127; 244/137.1; 244/116; 244/118.1
(58) Field of Search ............................. 244/127, 137.1, 244/137.4, 136, 118.1, 30, 29, 114 R, 115, 116

(56) References Cited

U.S. PATENT DOCUMENTS

| 1,748,500 | * | 2/1930 | Thaden ................................ 244/115 |
| 1,770,675 | * | 7/1930 | Short .................................. 244/116 |
| 1,853,777 | * | 3/1932 | Powelson et al. ................... 244/116 |
| 3,103,330 | * | 9/1963 | Nelson et al. ...................... 244/127 |
| 3,393,769 | | 7/1968 | Springer ............................... 182/82 |
| 3,976,268 | * | 8/1976 | Crosby, Jr. .......................... 244/115 |
| 4,124,181 | * | 11/1978 | Kolwey ............................. 244/134.1 |
| 5,346,162 | * | 9/1994 | Belie et al. ....................... 244/137.1 |
| 5,431,359 | * | 7/1995 | Belie .................................. 244/116 |
| 5,497,962 | * | 3/1996 | Wood .................................. 244/116 |
| 5,593,113 | * | 1/1997 | Cox .................................. 244/137.1 |
| 5,788,186 | * | 8/1998 | White ............................... 244/137.4 |

FOREIGN PATENT DOCUMENTS

| 2 950 9940 | 11/1995 | (DE) .................................... 182/82 |
| 2 364 854 | 4/1978 | (FR) .................................... 244/127 |
| 2 055 728 | 3/1981 | (GB) .................................... 244/127 |

* cited by examiner

Primary Examiner—Peter M. Poon
Assistant Examiner—Son T. Nguyen
(74) Attorney, Agent, or Firm—Dilworth & Barrese LLP.

(57) ABSTRACT

A method for the exact setting down or taking up of cargo from aircraft is disclosed. When setting down persons or cargo from aircraft which has not landed, the problem arises of an exact setting down not being possible, or only with great difficulty, in particular under adverse weather conditions. The invention provides a method whereby exact and even "spot-on" setting down or taking up of a load is made possible, even if the ambient conditions do not allow the aircraft to be kept steady. With the spatial framework of ropes biased by the aircraft, the position of the load in space is clearly fixed. The load can thus be exactly lowered down to the ground or taken up from the ground, without it being necessary for the aircraft to be still. Here, the aircraft itself is located at an appropriately selected distance above the load. The invention can also be applied to transportation by airships to construction sites, to catastrophe regions, etc.

26 Claims, 4 Drawing Sheets

9 Ship and working load are pulled down. Ropes in the center help fine-adjustment.

10 The load is positioned on the ground and fixed in place.

11 Ballast weights are hung on the working load frame (water, fuel, etc.)

12 The frame is separated from the working load and let up together with the ballast.

5 Throwing down the lines, assignment to the correct anchoring points (if the load has to be turned)

6

Fixing the ropes to the anchoring points

7

Tautening the retaining lines (via winches), generation of additional uplift at ship

8

When ropes are taut, substantial uplift is generated by releasing ballast water. The ship can move freely again 9 Ship and working load are pulled down. Ropes in the center help fine-adjustment.

10 The load is positioned on the ground and fixed in place.

11 Ballast weights are hung on the working load frame (water, fuel, etc.)

12 The frame is separated from the working load and let up together with the ballast.

13

14
Slackening the retaining lines to release the anchoring points.

18

Transistion to flight.

17

Ascent to flying height.

16

Retracting the working load frame. Closing the hold.

15
Retracting the lower retaining ropes

METHOD FOR THE PRECISE SETTING DOWN OR PICKING UP OF CARGO FROM AIRSHIPS

BACKGROUND OF THE INVENTION

The present invention relates to a method for the exact setting down or taking up of cargo from aircraft without these needing to land. The cargo to be unloaded is let down on a rope from the aircraft. For securing and spatial fixing purposes, a link is made to the ground at a later time by means of several ropes tightened in space. The rope framework produced in this way is held under bias by the aircraft. For further lowering, the ropes are rolled up or otherwise shortened. To take up cargo, a method correspondingly reversed as regards the order of the steps is performed for setting down of packages from an aircraft.

SUMMARY OF THE INVENTION

The present invention relates to a method for the exact setting down or taking up of cargo from aircraft, without these landing.

It is known to load or unload cargo or persons from aircraft. In this process, the problem arises that it is necessary to land for this purpose.

It is further known to let down or take up persons or cargo from aircraft which have not landed, by means of a rope winch. Here, the problem arises that an exact setting down is possible only with great difficulty, particularly in adverse weather conditions. This method can therefore not be used in a wide variety of applications.

It is therefore the object of the invention to provide a method whereby an exact and even "spot-on" setting down or taking up of a load is made possible even if the ambient conditions do not allow the aircraft to be kept steady.

This object is solved using a method with the load to be let down being fixed spatially via a biased spatial rope framework.

Thanks to the biased spatial framework, the position of the load in space is clearly fixed and the load can thus be lowered down to the ground or taken up from the ground exactly without it being necessary for the aircraft to be still. Here, the aircraft itself is located at an appropriately selected distance above the load.

In an appropriate further development of the invention, the bias in the rope framework is disposed by the aircraft or systems affixed to it in such a way that further auxiliary systems from the ground can be eliminated.

It is advantageous for the maneuvering of the load near ground level to provide further rope systems, in addition to the rope framework, to fix the load in position in order to thus alleviate the problems arising due to the large angle of spread in the rope framework. Alternatively, the rope framework can also be set up over correspondingly designed guide pulleys, so that the angle of spread can be kept small, i.e. the fulcrum is moved upwards during the letting down in the direction of the setting down point.

The distance between the aircraft and the load can optionally be fixed or varied by means of a winch system so that the load is located inside the aircraft during transportation.

In the setting down or taking up process itself, the length of the ropes in the rope framework is changed, this being able to be done via winches or guide pulleys The position and number of winches per rope can be freely set.

Further features of the invention and advantageous embodiments are produced, as described below, wherein the description and the drawings show embodiments of the invention.

DESCRIPTION OF THE PREFERRED EMBODIMENTS

Figure 1:
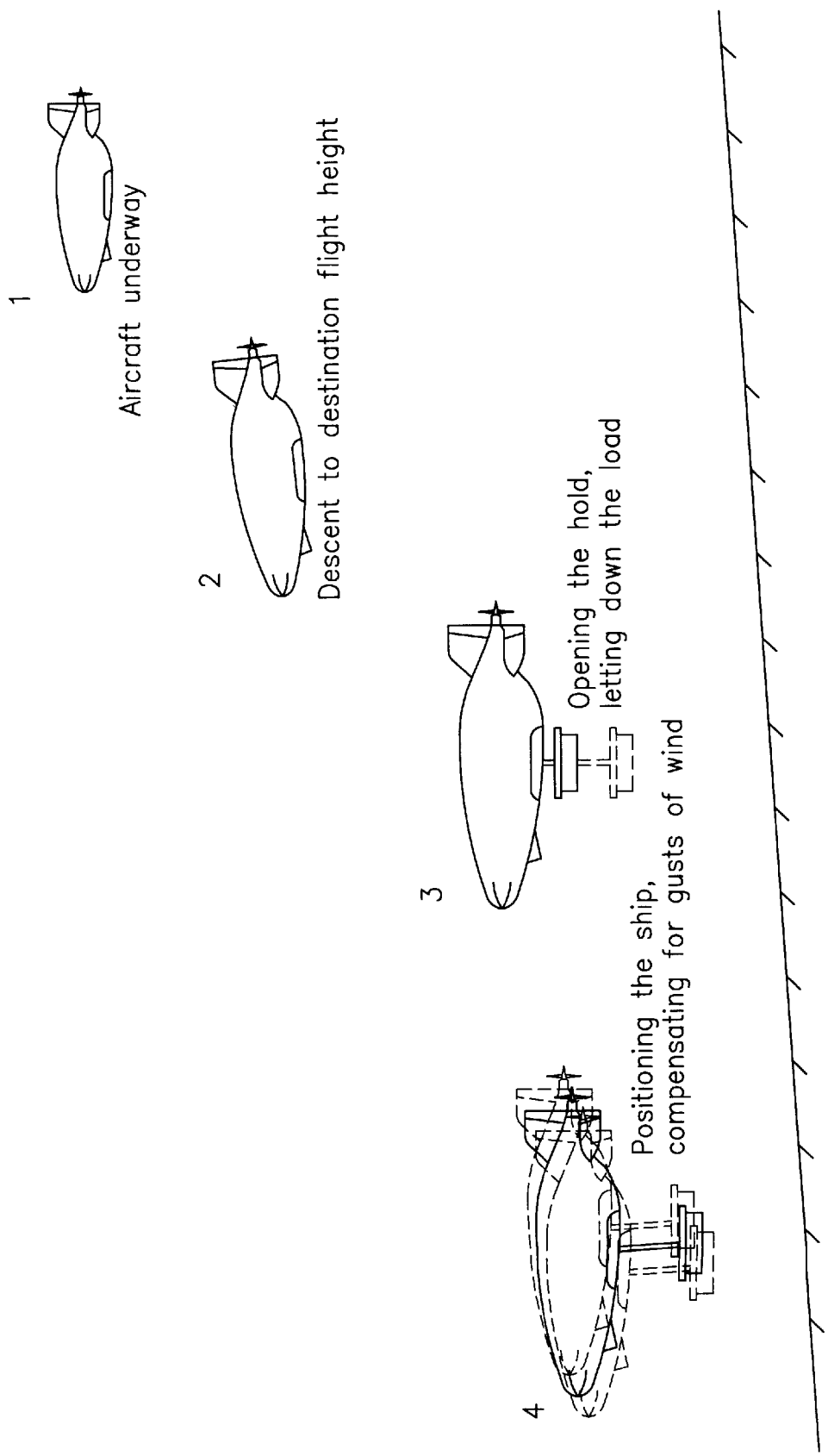
FIGS. 1 to 4 show a complete method of setting down a load. The taking up of a load is performed analogously in the reversed order of the method steps. Single steps can appropriately take place at the same time and are only shown separately here for reasons of better illustration. Moreover, the most inclusive representation possible was selected, i.e. individual steps may be omitted if the design realization permits it.

Steps 1 to 4 are shown in FIG. 1.

In step 1, the aircraft is still underway to the destination;

in step 2, the aircraft descends to the destination flight height selected according to the local situation and requirements;

in step 3, the hold is opened, if necessary, and the load let down. Alternatively, the load may always be located below the aircraft, that is, it need not be let down especially. This step would then be omitted;

in step 4, the aircraft is positioned at the destination flight height and must now compensate for the disturbances due to wind and changes in the uplift. But it does not need to be stationary, and can be in constant motion.

Figure 2:
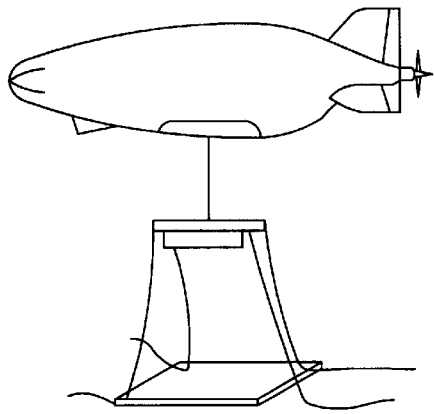
Figure 2:
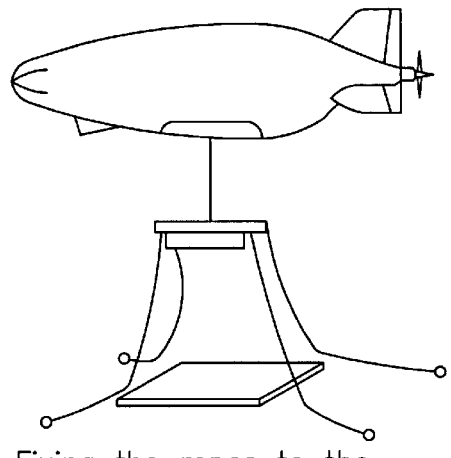
Figure 2:
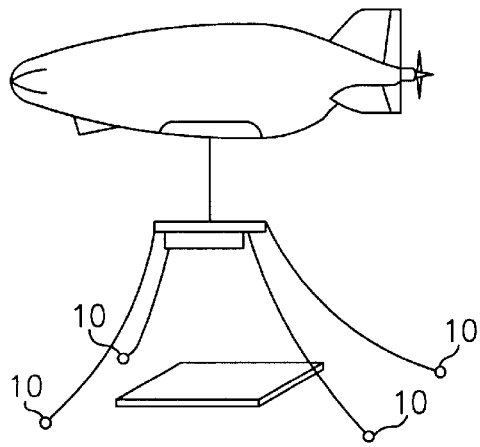
Figure 2:
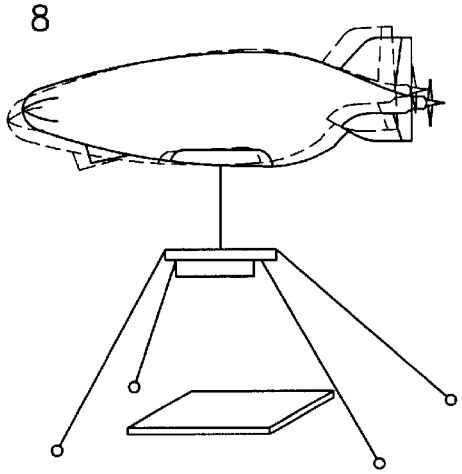

Steps 5 to 8 are shown in FIG. 2.

In step 5, the lines for tying to the ground are thrown down and taken to the tying points provided;

in step 6, the lines are fixed to the tying points. The lines are loose at this time;

in step 7, the lines are tautened via winches (10);

in step 8, the bias is increased to the required degree by increasing the uplift of the aircraft or the load frame.

Figure 3:
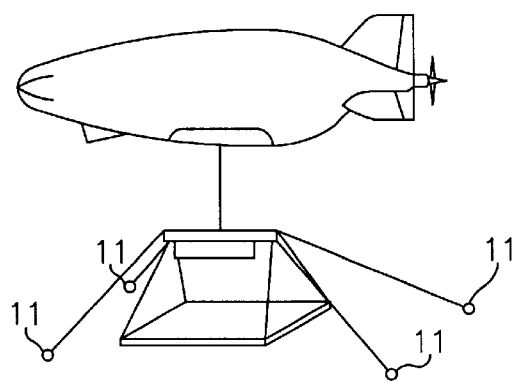
Figure 3:
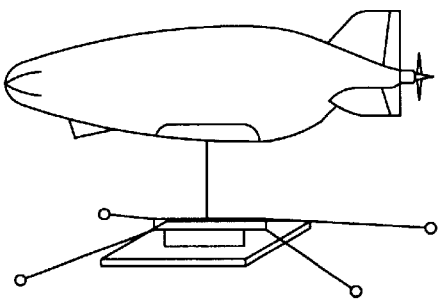
Figure 3:
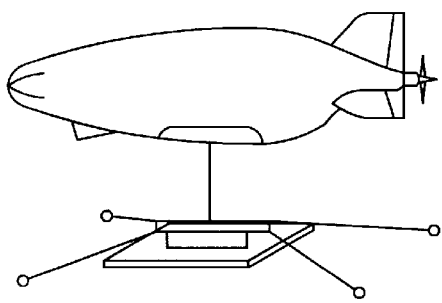
Figure 3:
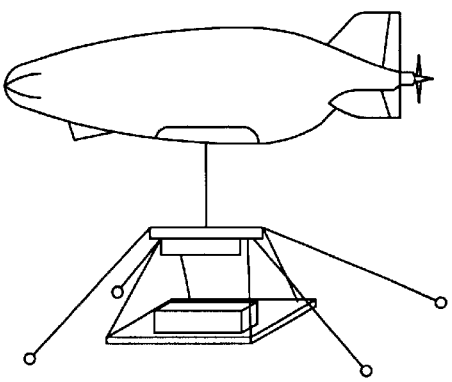

Steps 9 to 12 are collected in FIG. 3.

In step 9, the load is pulled downwards via the lower ropes. Here, the distance between aircraft and load is constant or variable as required. In the event of any especially high precision setting down being required, a precise fine adjustment can be achieved via auxiliary ropes or by means of a corresponding pulley assembly (11) of variable lower fulcrums of the main ropes;

in step 10, the load is placed and fixed on the ground;

in step 11, any necessary counterbalance weights are fixed to the load frame;

in step 12, the load is separated from the frame and let back up.

Figure 4:
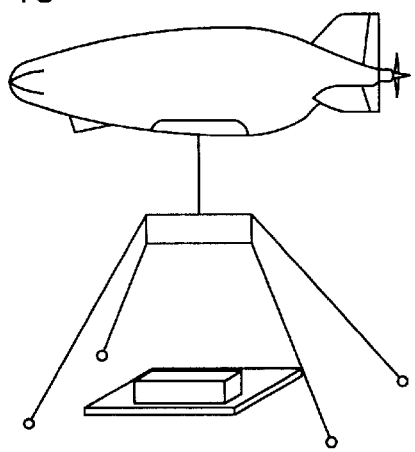
Figure 4:
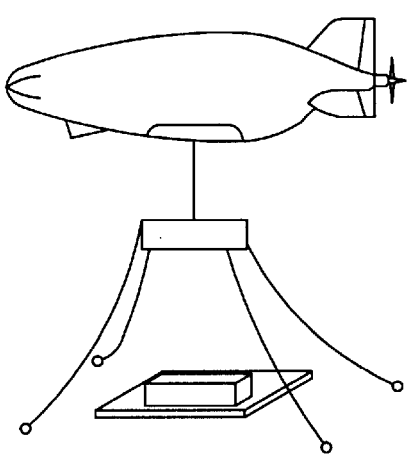
Figure 4:
Figure 4:
Figure 4:
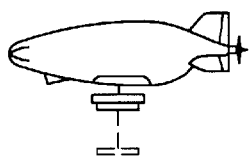
Figure 4:
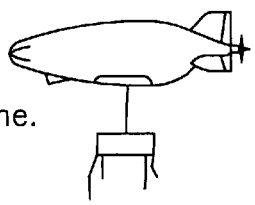

Steps 13 to 18 are shown in FIG. 4.

In step 13, the load frame is again above the set-down point; any required uplift compensation actions and controls are performed;

in step 14, the ropes are released, with these being previously slackened where provided for;

in step 15, the ropes, where provided, are retracted;

in step 16, the frame and the ballast, where provided, are retracted;

in step 17, the assent to flight height is initiated;

in step 18, the aircraft is once more underway, after transition to flight.

Alternatively to the airship shown, the aircraft can also be a balloon, a helicopter or any other aircraft which does not need any horizontal motion to generate uplift.

Accordingly, the frame shown to hang on the load can be omitted if this appears meaningful for the task in question.

What is claimed is:

1. A method for the exact setting down of cargo from aircraft not requiring horizontal motion to generate uplift without the aircraft landing or being anchored or remaining steady or still, comprising the steps of fixing spatially, a load to be let down, via a biased spatial rope framework without it being necessary for the aircraft to remain still, and hanging ballast or counterbalance weight to the load framework.

2. A method according to claim 1, wherein the bias in the rope framework is produced by the aircraft itself.

3. A method according to claim 1, wherein additional auxiliary ropes are used for, maneuvering near ground level.

4. A method according to claim 1, wherein an angle of spread in the rope framework with respect to the ground can be adjusted.

5. A method according to claim 1, wherein the load is located at a fixed distance below the aircraft.

6. A method according to claim 1, wherein the distance between load and aircraft can be varied via one or more ropes and winches.

7. A method according to claim 1, wherein the length of the ropes in the framework is adjusted via winches located on the ground.

8. A method according to claim 1, wherein the length of the ropes in the framework is adjusted via winches located at a top point of the rope framework above ground.

9. A method according to claim 1, wherein the length of the ropes in the framework is adjusted via winches around which in the ropes are wrapped.

10. A method according to claim 1, wherein the length of the ropes can be adjusted via guide pulleys in the rope framework and multiple alternate adjustment between two points.

11. A method according to claim 1, comprising the additional step of positioning the aircraft at destination flight height and only compensating for disturbances due to wind and changes in lift, such that the aircraft remains in constant motion.

12. A method according to claim 11, comprising the additional step of setting up the rope framework over correspondingly designed guide pulleys so that angle of spread with respect to the ground can be maintained small with a fulcrum moving toward the aircraft during lowering of the load, to thus alleviate problems arising due to large angle of spread in the rope framework.

13. A method according to claim 1, comprising the additional step of positioning the load for lowering, either underneath the aircraft or within a hold of the aircraft which is subsequently opened to let the load down.

14. A method according to claim 13, wherein the biased spatial rope framework is only coupled to the aircraft through the load, there being no other contact between the aircraft and the ground.

15. A method according to claim 1, comprising the additional step of biasing the spatial rope framework to required degree by increasing lift of the aircraft or at the load framework.

16. A method according to claim 15, wherein the uplift is created by releasing ballast water.

17. The method according to claim 1, wherein said ballast weight is constituted by water or fuel.

18. A method according to claim 1, wherein the ballast or counterbalance weight is affixed to the framework after positioning the load on the ground.

19. A method for the exact setting down of cargo from aircraft not requiring horizontal motion to generate uplift without the aircraft landing or being anchored or remaining steady or still, comprising the steps of:

positioning the aircraft at destination flight height and only compensating for disturbances due to wind and changes in uplift, such that the aircraft need not be stationary but remains in constant motion, dropping lines constituting a rope framework from the aircraft to ground and directing the lines to tying points upon the ground, fixing the lines to the tying points, the lines being slack at such point, tightening the lines, increasing bias of the spatial rope framework to required degree by increasing lift of the aircraft or at the framework itself, pulling the load to be lowered downwardly via certain of the lines constituting the rope framework, varying or maintaining distance between the aircraft and the load, placing the load upon the ground, hanging counterbalance weight to the load framework, and separating the load from the framework and allowing the framework to rise toward the aircraft.

20. A method according to claim 19, comprising the additional steps of:

positioning the load framework above a set down point and performing any compensating actions and controls required for uplift, slacking and then releasing the lines, retracting the lines into the aircraft, and retracting the framework and ballast.

21. A method according to claim 19, wherein the lines are tightened via winches such that length of the lines in the rope framework is changed.

22. The method according to claim 19, comprising the additional step of providing a fine precise adjustment of distance between the aircraft and load by provision of auxiliary lines for lowering the load.

23. A method according to claim 19, wherein the aircraft is selected from the group consisting of an airship, a balloon or a helicopter.

24. A method according to claim 19, wherein the uplift is created by releasing ballast water.

25. The method according to claim 19, wherein said ballast weight is constituted by water or fuel.

26. A method according to claim 19, wherein the ballast or counterbalance weight is affixed to the framework after positioning the load on the ground.

* * * * *